(12) United States Patent　(10) Patent No.: US 12,515,276 B2
Kiessling　(45) Date of Patent: Jan. 6, 2026

(54) TECHNIQUES AND APPARATUSES FOR BONDING LAMINATE STRUCTURES

(71) Applicant: CORNING INCORPORATED, Corning, NY (US)

(72) Inventor: Heiko Kiessling, Munich (DE)

(73) Assignee: Corning Incorporated, Corning, NY (US)

( * ) Notice: Subject to any disclaimer, the term of this patent is extended or adjusted under 35 U.S.C. 154(b) by 182 days.

(21) Appl. No.: 18/226,544

(22) Filed: Jul. 26, 2023

(65) Prior Publication Data

US 2024/0042545 A1　Feb. 8, 2024

Related U.S. Application Data

(60) Provisional application No. 63/394,387, filed on Aug. 2, 2022.

(51) Int. Cl.
*B23K 26/064*　(2014.01)
*B23K 26/08*　(2014.01)
(Continued)

(52) U.S. Cl.
CPC .......... *B23K 26/064* (2015.10); *B23K 26/082* (2015.10); *B23K 26/083* (2013.01);
(Continued)

(58) Field of Classification Search
CPC ............... B23K 26/0006; B23K 26/02; B23K 26/0622; B23K 26/0624; B23K 26/064; B23K 26/0643; B23K 26/0648; B23K 26/0652; B23K 26/08; B23K 26/082; B23K 26/083; B23K 26/0853; B23K 26/20; B23K 26/21; B23K 26/211; B23K 26/24;
(Continued)

(56) References Cited

U.S. PATENT DOCUMENTS

2014/0283986 A1* 9/2014 Kunichi ............ B29C 66/91216
　　　　　　　　　　　　　　　　　　156/272.8
2017/0157839 A1* 6/2017 Knoll .................. B29C 65/1635
(Continued)

FOREIGN PATENT DOCUMENTS

DE　　102010049460 A1　3/2012
JP　　　S62142092 A　*　6/1987
(Continued)

*Primary Examiner* — Michael A Tolin
(74) *Attorney, Agent, or Firm* — Amy T. Lang

(57) ABSTRACT

Methods, apparatuses, devices, and substrates are described. Multiple layers of a substrate may be bonded using a laser beam that is rotating about an axis and while the substrate is laterally translated with respect to the laser beam. Further, a direction of the laser beam may be modified such that the laser beam is incident on a surface of a layer of the substrate at an acute angle with respect to the surface. In such cases, the respective layers of the substrate may be bonded by irradiating the surface with the rotating laser beam, thereby resulting in spiral-shaped bonding lines between the layers. The layers may be bonded when one of the layers is coupled with an element (e.g., a blocking element), and the acute angle of the laser beam may enable irradiation an area that is below the element while leaving the element unaffected by the laser beam.

14 Claims, 8 Drawing Sheets

(51) Int. Cl.
*B23K 26/082* (2014.01)
*B23K 26/324* (2014.01)
*B29C 65/16* (2006.01)
B23K 103/00 (2006.01)
B32B 17/10 (2006.01)
C03B 23/203 (2006.01)

(52) U.S. Cl.
CPC ........ *B23K 26/324* (2013.01); *B29C 65/1635* (2013.01); *B29C 65/1638* (2013.01); *B23K 2103/54* (2018.08); *B32B 17/10807* (2013.01); *C03B 23/203* (2013.01)

(58) Field of Classification Search
CPC ...... B23K 26/244; B23K 26/28; B23K 26/32; B23K 26/324; B23K 26/50; B23K 26/57; B23K 2103/18; B23K 2103/50; B23K 2103/54; B29C 65/1429; B29C 65/1432; B29C 65/1435; B29C 65/1438; B29C 65/1445; B29C 65/1448; B29C 65/1454; B29C 65/1458; B29C 65/1461; B29C 65/16; B29C 65/1629; B29C 65/1632; B29C 65/1635; B29C 65/1638; B29C 65/1645; B29C 65/1648; B29C 65/1654; B29C 65/1658; B29C 65/1661; B32B 7/05; B32B 7/12; B32B 17/10; B32B 17/10005; B32B 17/10009; B32B 17/10036; B32B 17/10807; B32B 17/10899

See application file for complete search history.

(56) References Cited

U.S. PATENT DOCUMENTS

2018/0021887 A1\* 1/2018 Liu ...................... B23K 26/342
   219/121.75
2018/0221989 A1\* 8/2018 Matsuoka ............ B23K 26/082

FOREIGN PATENT DOCUMENTS

WO  2006/116722 A3  9/2007
WO  2012/035031 A1  3/2012

\* cited by examiner

TECHNIQUES AND APPARATUSES FOR BONDING LAMINATE STRUCTURES

This application claims the benefit of priority under 35 U.S.C § 120 of U.S. Provisional Application Ser. No. 63/394,387 filed on Aug. 2, 2022, the content of which is relied upon and incorporated herein by reference in its entirety.

FIELD OF TECHNOLOGY

The present disclosure relates generally to laminates, and more specifically to techniques and apparatuses for bonding laminate structures.

BACKGROUND

Laminate structures that include two or more layers of material may have improved properties that may not be achieved by a single material. As an example, laminate structures may provide enhanced material strength, durability, and safety via the bonding of multiple layers of one or more materials, and laminated structures may accordingly be used in various products and applications. For instance, laminated glass may include two or more layers of a glass material that provides enhanced safety features across various applications and industries. In other examples, electrical laminate structures may be used in various electronics (e.g., printed circuit boards (PCBs), electrical isolation materials, generators, electrical machinery, among other examples) based on some properties of the laminate structure, such as electrical isolation properties. Respective layers of a laminate structure may be bonded together via different techniques, including heat, pressure, welding, or adhesives. In some cases, however, one or more layers of a laminate structure may include components that may be sensitive to the bonding process, presenting challenges when bonding multiple layers of a laminate structure.

SUMMARY

The methods, apparatuses, devices, and substrates of this disclosure each have several new and innovative aspects. This summary provides some examples of these new and innovative aspects, but the disclosure may include new and innovative aspects not included in this summary.

The described techniques relate to improved methods, apparatuses, devices, and substrates that support bonding laminate structures. For example, two or more layers of a substrate may be bonded together using heat from an incident laser beam that is rotating about an axis of a path of the laser beam, producing one or more spiral-shaped bonding lines that result in enhanced bonding of the respective layers. In some examples, the substrate may include a first layer and a second layer positioned above the first layer, and the laser beam may be incident on a surface of the first layer at an acute angle with respect to the surface of the first layer. The substrate may be translated in a lateral direction with respect to the laser beam during the bonding process. Here, the acute angle of the laser beam may enable the irradiation of at least the surface of the first layer in a region that is below one or more elements that are coupled with one of the layers (e.g., coupled with the second layer). The laser beam may be modified using an optic (e.g., a Trepanier optic) to create the laser beam that rotates about the axis, and the rotating laser beam may be directed to the surface of the first layer at the acute angle based on one or more optical components. In some aspects, the optical component(s) may include one or more mirrors or lenses, or a combination thereof, that modify a direction of the laser beam. Additionally, or alternatively, the optical components may include a focusing lens used for focus correction at the surface of the second layer. In any case, the layers of the substrate may be bonded together in the presence of an element (e.g., a functional element, a blocking element) that is coupled with the surface of the first layer, but the element may not be affected (e.g., may not be irradiated) by the laser beam.

A method is described. The method may include irradiating a surface of a first layer of a substrate using a laser beam that is rotating about an axis of a path of the laser beam and that is incident on the first layer at an acute angle with respect to the surface of the first layer, the substrate comprising at least the first layer and a second layer different from the first layer. In some examples, the method may include translating, while irradiating the surface of the first layer, the substrate in a lateral direction relative to the laser beam to bond the first layer and the second layer using the laser beam.

An apparatus is described. The apparatus may include a laser source configured to generate a laser beam along a path, a first optic configured to receive the laser beam and cause the laser beam to rotate about an axis of the path, and an optical component configured to receive the laser beam output by the first optic and cause the laser beam to be incident on a substrate at an acute angle relative to a surface of the substrate, the substrate including a plurality of layers. In some examples, the apparatus may include a support component configured to laterally translate the substrate relative to the path while the laser beam is incident on the substrate.

A bonded substrate is described. The bonded substrate may include a first layer and a second layer above the first layer, the first layer having a surface that is bonded to the second layer via one or more irradiated spiral paths across the surface, where a portion of the second layer includes a blocking element that is unaffected by irradiation, and where a portion of the first layer beneath the portion of the second layer includes at least one irradiated spiral path bonding the first layer and the second layer.

DETAILED DESCRIPTION

Figure 1:
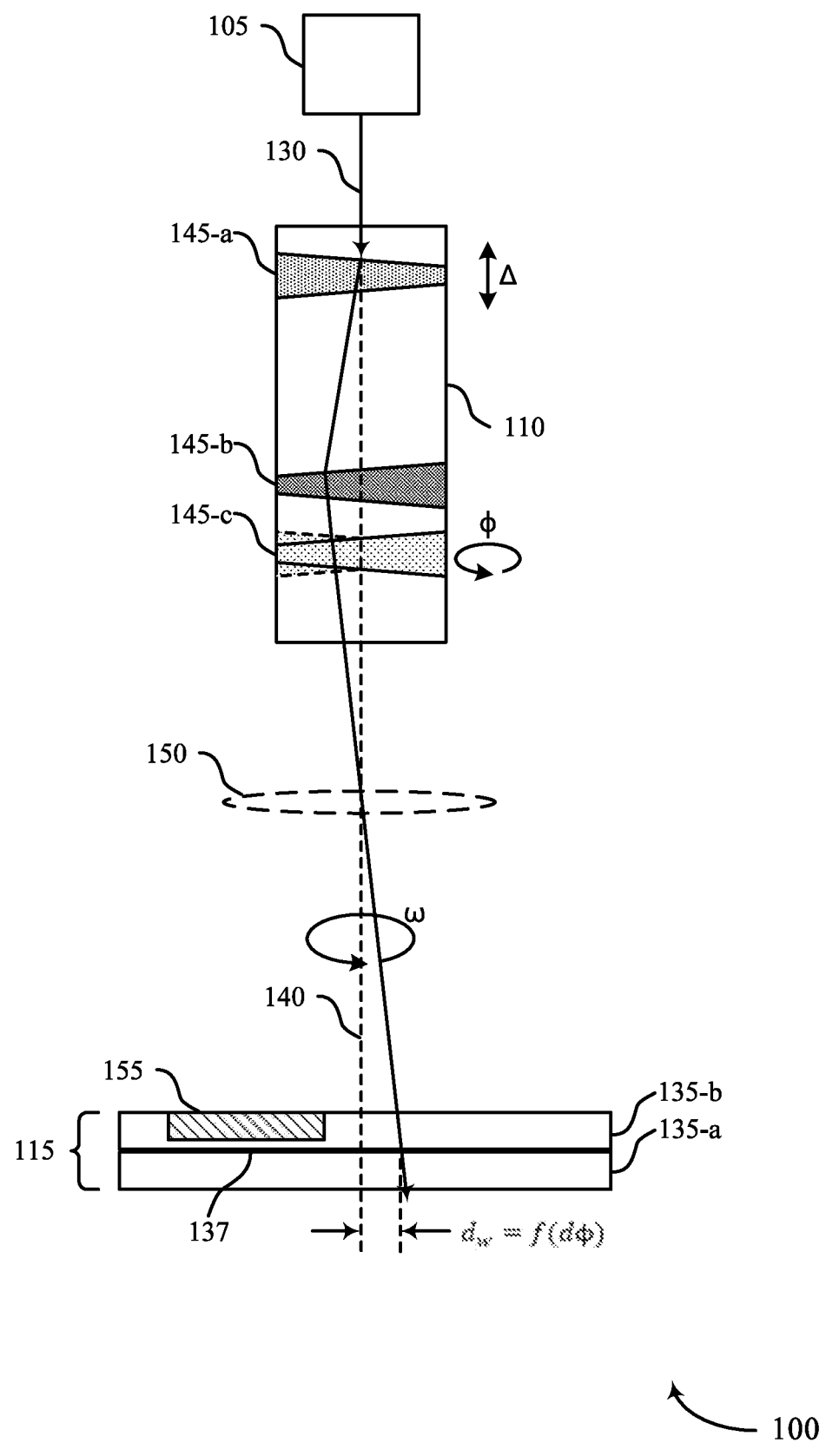
FIG. 1 illustrates an example of a system that supports techniques and apparatuses for bonding laminate structures in accordance with one or more aspects of the present disclosure.

Laminate structures, which may be referred to as laminates, laminated materials, or other similar terminology, may provide relatively increased material strength, durability, and safety over other types of structures and materials. For example, laminate structures include two or more layers of material that, when bonded together, have properties that are improved with respect to other structures. The bonded layers (e.g., plates, sheets) of a laminate structure may accordingly be configured for various use cases, products, and applications that take advantage of these improved properties. As one example, laminated glass (sometimes referred to as "safety glass") may include two or more layers of a glass material that provides improved safety in the event of breakage (e.g., the lamination may hold broken shards of the glass material in place), which may be advantageous in automotive and other applications. In other examples, electrical laminate structures may be used in various electronics (e.g., printed circuit boards (PCBs), electrical isolation materials, generators, electrical machinery, among other examples) due to various properties of the laminate structure, such as dielectric properties, and lamination processes may be used to prevent some conductive materials in a substrate from conducting current or carrying a signal. One or more types of materials may be bonded to create the laminate structures.

Respective layers of a laminate structure may be bonded via various techniques, including heat, pressure, welding, adhesives, or a combination thereof. For example, heat may be used to melt (e.g., at least partially melt) at least a first layer of a substrate, resulting in another layer being bonded to the first layer, thereby combining the two layers. The heating of the first layer may be achieved by exposing a surface of the layer to electromagnetic radiation, such as light from a laser beam or heat from other heat sources, or both. Another process for bonding respective layers of a substrate includes irradiating a bonding line (e.g., by a laser beam) for melting an interlayer bonding material (e.g., a polymeric bonding material or other type of bonding material). The melted interlayer bonding material may result in the bonding of respective layers of the substrate to combine the two layers. Multiple bonding lines may be used to improve the bond strength between the respective layers, where the bonding lines may be, for example, parallel and adjacent to one other. Further, the distance between the respective bonding lines may be large enough to avoid influencing the bonding characteristic of each individual bonding line.

In some cases, however, one or more layers of a laminate structure may include components that may affected by the bonding process, presenting challenges when bonding multiple layers of a laminate structure. More specifically, a substrate may include a first layer and a second layer positioned above the first layer, and the second layer may be coupled with or include one or more elements (e.g., blocking elements, functional elements). The one or more elements may be coupled with the second layer prior to a bonding process, and it may be desirable to avoid damage to the elements when bonding the first and second layer. In such cases, the presence of the one or more elements may add complexity to the bonding process as an area below each element that may need to be heated to ensure complete bonding of the substrate layers. For instance, the presence of the one or more elements may prevent a laser beam from irradiating an area underneath each element, preventing melting of the area during the bonding process, and potentially weakening the bond. As such, improved techniques may be desirable to enable the bonding of layers of a laminate structure while ensuring that elements coupled with the substrate remain unaffected by the bonding process.

As described herein, techniques for bonding a laminate structure may utilize a laser beam that is incident on at least one layer of a substrate via an acute angle, enabling irradiation of a region that is located below an element coupled with the substrate and resulting in bonding of different substrate layers. For example, the substrate may include multiple (e.g., two) layers of a plate-shaped material (e.g., a glass material, a metallic material), and the layers may be arranged one above the other such that a surface of each plate-shaped material forms a common interface. The plate-shaped materials may be irradiated by a laser beam along one or more bonding pathways (e.g., the laser beam may be focused at or near at least one surface of the plate-shaped materials, and the laser beam may be rotating about an axis of a path of the laser beam. While the laser beam is irradiating the plate-shaped materials, the plate-shaped materials may be translated relative to the laser beam to generate the one or more bonding pathways. The laser beam may cause material modification in at least one of the plate-shaped materials (and/or in a boundary layer) such that the plate-shaped materials are bonded together, and the one or more bonding pathways of the material modification along the bonding pathway may describe spiral shaped sub-pathways.

Aspects of the disclosure are initially described in the context of systems used to bond multiple layers of a substrate to create a laminate structure. Aspects of the disclosure are further illustrated by and described with reference to bonding lines and flowcharts that relate to techniques and apparatuses for bonding laminate structures.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

It should be appreciated by a person skilled in the art that one or more aspects of the disclosure may be implemented in a system to additionally, or alternatively, solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

FIG. 1 illustrates an example of a system 100 that supports techniques and apparatuses for bonding laminate structures in accordance with one or more aspects of the present disclosure. In some examples, the system 100 may support the use of a laser beam shaped using a Trepanier optic for irradiating at least one layer of a substrate and creating one or more spiral-shaped bonding lines. The system 100 may include various components and devices, such as a laser source 105, a first optic 110, and a substrate 115.

The laser source 105 may be configured to output a laser beam 130 for bonding a laminate structure. The laser source 105 may be an example of or include a pulsed laser (e.g., an ultrashort pulsed laser, a picosecond pulsed laser, a nanosecond pulsed laser, or the like) that is configured to operate at some wavelength of light, $\lambda$. The laser source 105 may generate optical power in multiple pulses (e.g., bursts) with some repetition. Each laser beam pulse may include a burst of multiple sub-pulses, and a duration of a sub-pulse may be some quantity of nanoseconds (ns) in duration, some quantity of femtoseconds (fs) in duration, among other example durations. In some examples, the duration of one pulse (e.g., including the burst of multiple sub-pulses) may be some quantity of microseconds in duration. The laser source 105 may be an example of a mode-locked laser, a Q-switching laser, a pulsed-pumping laser, among other examples, that generates a pulsed output (e.g., a non-continuous output). The laser source 105, however, may be an example of another type of laser not mentioned herein, and the examples described herein should not be considered limiting to the scope covered by the claims or the disclosure. In some aspects, a wavelength of the laser source 105 may be configured for processing the substrate 115. For instance, the wavelength, $\lambda$, of the laser source 105 may be based on a material of the substrate 115, such that the substrate 115 is substantially transparent to the laser light generated by the laser source 105.

In some aspects, the laser source 105 may be configured for modifying (e.g., melting, partially melting) at least a portion of the substrate 115 for bonding respective layers (e.g., a first layer 135-$a$ and a second layer 135-$b$) of the substrate 115. As an example, the substrate 115 may include a first layer 135-$a$ and a second layer 135-$b$ different from the first layer 135-$a$. The first layer 135-$a$ and the second layer 135-$b$ may be positioned on top of each other (e.g., stacked) such that a surface (e.g., a major surface) of each layer forms a common interface. The laser source 105 may be accordingly configured to output the laser beam 130 that is incident on at least one surface of the first layer 135-$a$ or the second layer 135-$b$, or both, and (e.g., when focused) irradiates the at least one surface. The irradiation may result in at least some melting of the first layer 135-$a$ or the second layer 135-$b$, or both, which may in turn bond the first layer 135-$a$ and the second layer 135-$b$. In other examples, an interlayer bonding material 137 may be located between the first layer 135-$a$ and the second layer 135-$b$. The laser source 105 may be configured to output the laser beam 130 for at least partially melting the interlayer bonding material 137 and the interlayer bonding material 137, when irradiated by the laser beam 130, may bond the first layer 135-$a$ and the second layer 135-$b$ together (e.g., the interlayer bonding material 137 may at least partially melt when irradiated by the laser beam 130).

In some examples, the first layer 135-$a$ may include a plate-shaped material and the second layer 135-$b$ may include a plate-shaped material. The materials of the first layer 135-$a$ and the second layer 135-$b$ may be the same or different materials. As an example, the first layer 135-$a$ or the second layer 135-$b$, or both, may be a glass material that may include, for example, a glass material including one or more glass compositions. In some aspects, the first layer 135-$a$ or the second layer 135-$b$, or both, may include a soda-lime glass material, a borosilicate glass material, an aluminosilicate glass material, an alkali aluminosilicate glass material, an alkaline earth aluminosilicate glass material, an alkaline earth boro-aluminosilicate glass material, a fused silica glass material, a crystalline material (e.g., sapphire, silicon, gallium arsenide, other materials, or any combination thereof), among other examples. In some examples, the first layer 135-$a$ or the second layer 135-$b$ may include a metallic material. For instance, the first layer 135-$a$ or the second layer 135-$b$ may be an example of or include a relatively thin layer of metallic material (e.g., a foil). Additionally, or alternatively, the first layer 135-$a$ or the second layer 135-$b$, or both, may be an example of or include other types of materials not explicitly described herein.

The first optic 110 may be configured to modify a propagation of the laser beam 130 such that the laser beam 130 rotates about an axis of a path of the laser beam 130 (e.g., a beam path 140). As an example, the first optic 110 may be an example of a Trepanier optic system that causes the laser beam 130 to rotate about an axis of the beam path 140. A Trepanier optic may refer to an optical component that is configured to deflect a beam axis with an oscillating offset with respect to the beam path 140. In some examples, a Trepanier optic may generate a circular movement of a beam spot (e.g., of the laser beam 130) by turning one or more optical plates. For example, the first optic 110 may include one or more optical components (e.g., optical plates, wedge plates (which may be referred to as optical wedges, or wedge prisms)) that may be configured to shape the propagation of the laser beam 130. A wedge plate may be an example of an optical component having an intended and controlled lack of parallelism between the surfaces (e.g., having a geometry of a wedge), which may be used for steering of the laser beam 130. In some examples, the first optic 110 may include a first optical plate 145-$a$, a second optical plate 145-$b$, and a third optical plate 145-$c$. The first optic 110, however, may have a different number, type, or composition of optical components that cause the laser beam 130 to rotate about an axis of the beam path 140.

The first optical plate 145-$a$ may be configured to modify a direction of (e.g., deflect) the laser beam 130 toward the second optical plate 145-$b$. In some examples, the first optical plate 145-$a$ may be further configured to be adjustable within some displacement (e.g., vertical displacement), $\Delta$. The displacement of the first optical plate 145-$a$ may, for example, modify a distance, $d_w$, of the laser beam 130 from the axis of the beam path 140 as the laser beam 130 rotates about the beam path 140. For example, the first optical plate 145-$a$ may create an initial offset of the laser beam 130 away from the beam path 140. The second optical plate 145-$b$ may be used to modify a direction of (e.g., deflect) the laser beam 130 towards the third optical plate 145-$c$. In some aspects, the third optical plate 145-$c$ may be configured to rotate with some rotational displacement, $\phi$, causing the laser beam 130 to rotate about the axis of the beam path 140. In some cases, the distance, $d_w$, of the laser beam 130 from the axis may be based on the rotational displacement, $\phi$ (e.g., may be a function of the rotational displacement, $\phi$). Thus, the first optical plate 145-$a$ and the second optical plate 145-$b$ of the first optic 110 may cause the laser beam 130 to rotate about an axis of the beam path 140, and the laser beam 130 may have some rotational velocity (e.g., angular velocity), $\omega$.

In some examples, the system 100 may optionally include one or more optics 150 that may modify a focal distance of the laser beam 130 (e.g., based on a position of the substrate 115 relative to the one or more optics 150). The one or more optics 150 may be configured to focus the laser beam 130 at a location of the substrate 115 where the laser beam 130 is incident on a surface of the first layer 135-$a$ or a surface of the second layer 135-$b$, or both, for bonding the first layer 135-$a$ and the second layer 135-$b$ (e.g., by at least partially melting the first layer 135-$a$ or the second layer 135-$b$). In other examples, the one or more optics 150 may focus the laser beam 130 at a location of the substrate 115 where the laser beam 130 is incident on an interlayer bonding material for bonding the first layer 135-$a$ and the second layer 135-$b$ (e.g., by melting the interlayer bonding material). The one or more optics may be an example of a lens, a mirror, or other optical component configured to modify a focus of the laser beam 130. In some cases, the one or more optics 150 may include at least one optic that is used to shape the laser beam 130 into a beam having multiple focal lengths, and the optic may be an example of a diffractive optical element or other beam-shaping optical component, such as a multifocal diffractive lens. In some aspects, the second optic may be used to generate multiple focal lengths that are used to focus the laser beam 130 on one or more layers (e.g., the first layer 135-a, the second layer 135-b, or both) of the substrate 115 when bonding the layers together. The one or more optics 150 may be positioned at different locations along the beam path 140.

When using the system 100 to bond the first layer 135-a and the second layer 135-b of the substrate 115, the substrate 115 may be translated in a lateral direction with respect to the laser beam 130, which may create one or more bonding pathways that have a spiral shape (e.g., due to the laser beam 130 rotating about the axis of the beam path 140). That is, the substrate 115 is translated relative to the beam path 140 to move the laser beam 130 along a bonding pathway. Irradiating the first layer 135-a, or the second layer 135-b, or an interlayer bonding material, or any combination thereof, with the laser beam 130 may result in material modification along each bonding pathway where the first layer 135-a and the second layer 135-b are bonded. Because of the translation movement, the laser beam 130 may be observed to wobble (e.g., oscillate) with a spiral-shaped motion along each bonding pathway, where the laser beam 130 may "wobble" with a threshold (e.g., maximum) distance, $d_w$, from the beam path 140 (e.g., as measured at the surface of the layer where the laser beam 130 is focused).

In some cases, however, the substrate 115 may include one or more components or elements 155 (e.g., a functional element, a blocking element) that may prevent the laser beam 130 from being directly incident on one or more of the layers (e.g., on the first layer 135-a). As an example, the second layer 135-b may be coupled with an element 155 prior to the bonding process. The element 155 may be in contact with (e.g., touching) the second layer 135-b. In some examples, the element 155 may be adhered to the second layer 135-b (e.g., via an adhesive material or other material, via a bonding process). The element 155 may be an example of or may include one or more components that may be affected by (e.g., damaged by) radiation from the laser beam 130. In some aspects, a material of the element 155 may prevent irradiation of any surface positioned below the element 155. As such, when bonding the first layer 135-a and the second layer 135-b (e.g., in a configuration where the beam path 140 is perpendicular to the substrate 115, as illustrated), a portion of the substrate 115 beneath the element 155 may not be irradiated. The inability to irradiate this portion of the substrate 115 may result in a relatively weaker bond between the first layer 135-a and the second layer 135-b (e.g., compared to other portions of the substrate 115), particularly in areas nearby or surrounding the element 155. The relatively weaker bond may compromise the properties of the bonded substrate 115 after the bonding process, or result in other undesirable effects.

Thus, as described herein, improved techniques and apparatuses may be used to fully bond the first layer 135-a and the second layer 135-b of the substrate 115, including the region beneath the element 155. For example, one or more optics may be used to modify a direction of the laser beam 130 after the first optic 110 or after the one or more optics 150. The modified direction of the laser beam 130 may cause the laser beam 130 to be incident on, for example, the first layer 135-a at an acute angle with respect to a surface of the first layer 135-a. As a result, the laser beam 130 may irradiate a portion of the first layer 135-a that is beneath the element 155 (e.g., without irradiating the element 155), thereby enhancing the bonding of the first layer 135-a and the second layer 135-b. In other examples, the laser source 105, or the first optic 110, or both may be rotated such that the laser beam 130 is incident on, for example, the first layer 135-a at an acute angle with respect to a surface of the first layer 135-a. The modification of the positioning and orientation of the laser source and/or the first optic 110 may similarly result in the laser beam 130 irradiating a portion of the substrate 115 beneath the element 155 (e.g., without irradiating the element 155). In such cases, some optical components may be included after the first optic 110 or after the one or more optics 150 for focus correction of the laser beam 130 where the laser beam 130 is incident on the first layer 135-a. Such techniques may produce a bonded laminate structure with spiral shaped bonding pathways between respective layers.

The described techniques and apparatus may enable fast and efficient processing of the substrate 115 to bond the first layer 135-a and the second layer 135-b and generate the bonded laminate structure. In some aspects, the use of the laser beam 130 rotating about the axis of the beam path 140 may increase an effective area associated with the bonding pathway, resulting in relatively fewer processing passes on the substrate 115 to bond the first layer 135-a and the second layer 135-b. Moreover, the described techniques may enable a portion of the substrate 115 below the element 155 to be bonded (e.g., the region between the first layer 135-a and the second layer 135-b and below the element 155 to be bonded) using the laser beam 130 that is rotating about the axis of the beam path 140, while also preventing the laser beam 130 from being incident on the element 155. Such techniques may enable the tilting of the laser beam 130, as described in further detail in FIGS. 2 and 3. As such, the element 155 may not be damaged by the laser beam 130 during the bonding process when using the tilted beam, and the respective layers of the substrate 115 may be irradiated to generate the bonded laminate structure.

Figure 2A:
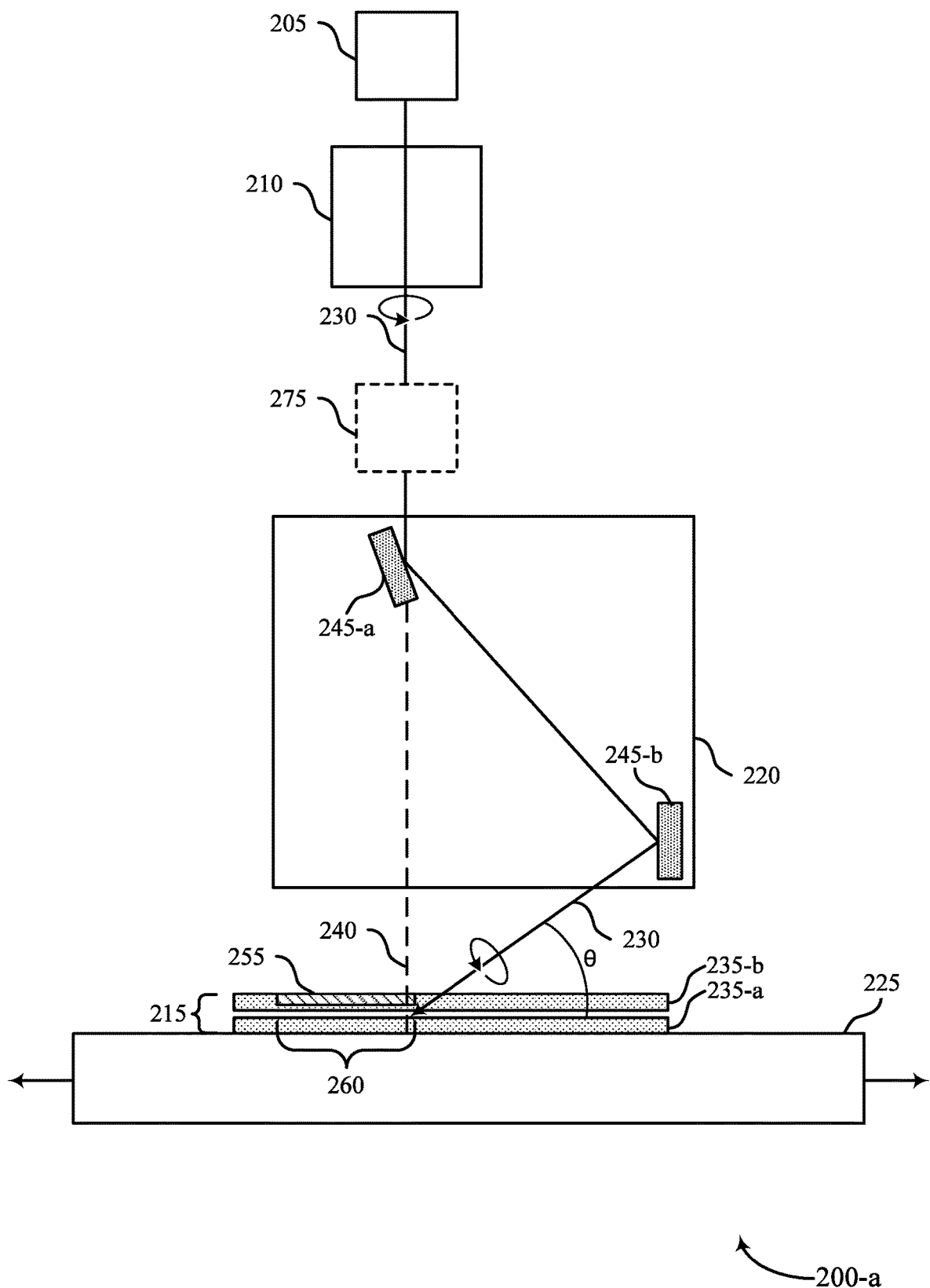
FIGS. 2A, 2B, and 2C illustrate examples of a system that supports techniques and apparatuses for bonding laminate structures in accordance with one or more aspects of the present disclosure.
Figure 2B:
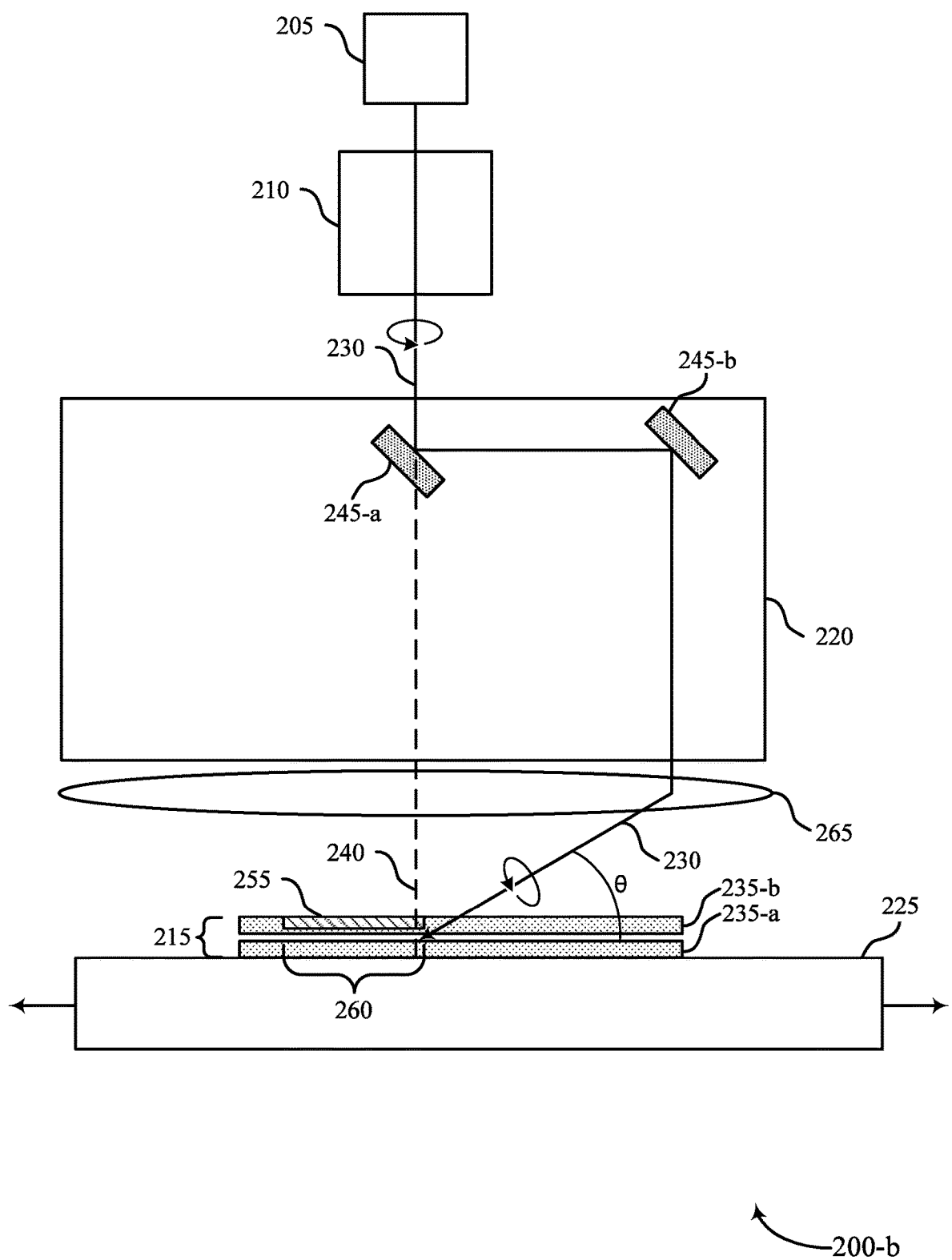
Figure 2C:
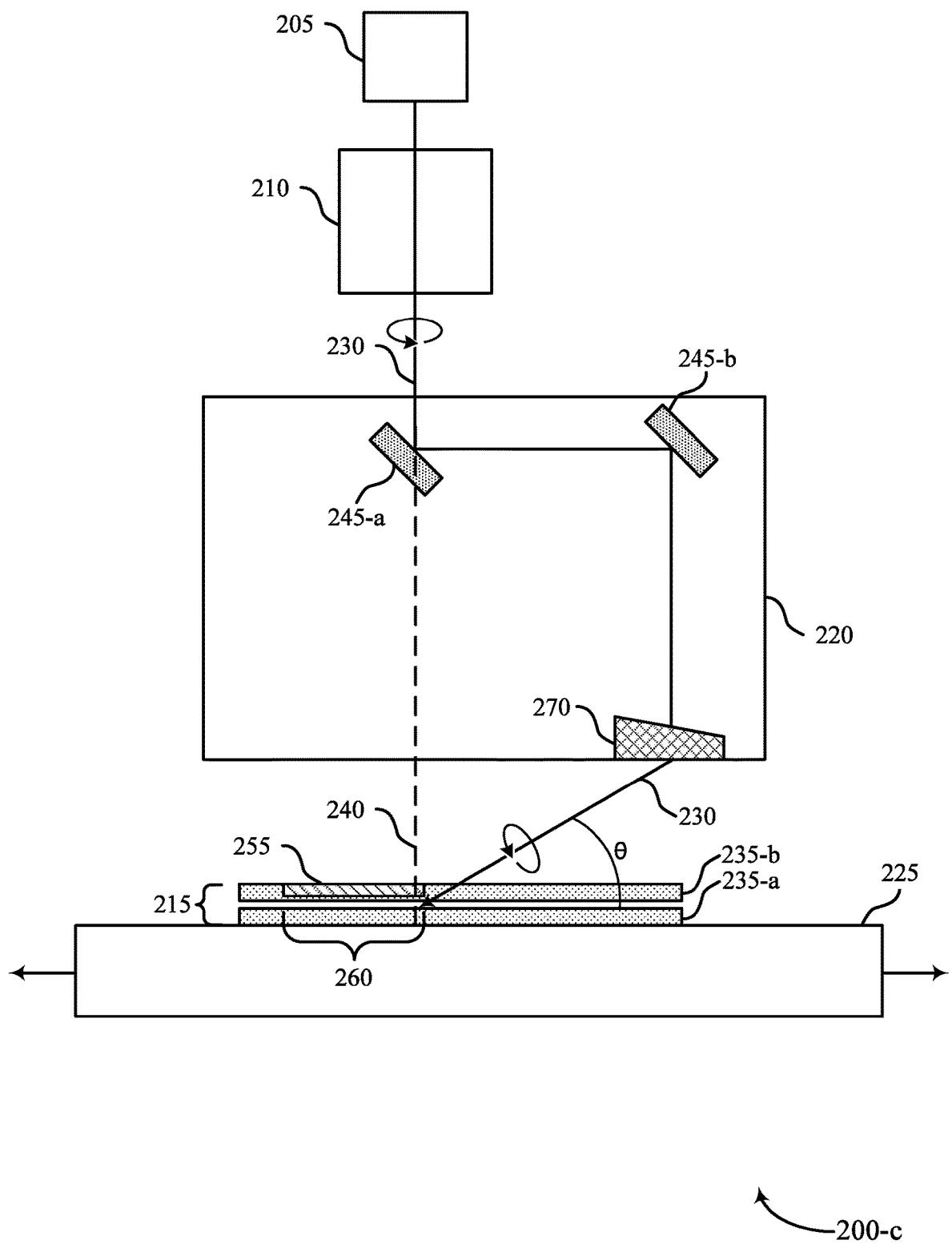

FIGS. 2A, 2B, and 2C illustrate examples of a system (e.g., a system 200-a, a system 200-b, a system 200-c) that supports techniques and apparatuses for bonding laminate structures in accordance with one or more aspects of the present disclosure. In some examples, the system 200-a, the system 200-b, and the system 200-c each support the irradiation of one or more layers of a substrate using a laser beam that rotates about an axis of a beam path (e.g., using a Trepanier optic) and is incident on the one or more layers at an acute angle. The system 200-a, the system 200-b, and the system 200-c may be examples of the system 100 described with reference to FIG. 1. For instance, the system 200-a, the system 200-b, and the system 200-c may each include various components, such as a laser source 205, a first optic 210, and a substrate 215. Further, the system 200-a, the system 200-b, and the system 200-c may include an optical component 220 and a support component 225. The system 200-a, the system 200-b, and the system 200-c may be configured to bond respective layers of a laminate structure, including a region below an element coupled with the substrate 215.

The laser source 205 may be an example of the laser source 105 described with reference to FIG. 1. For example, the laser source 205 may generate a laser beam 230 that is used to irradiate one or more layers (e.g., a first layer 235-a, a second layer 235-b) of the substrate 215 for bonding the layers. The first layer 235-*a* and the second layer 235-*b* may be an example of the first layer 135-*a* and the second layer 135-*b*, respectively, described with reference to FIG. 1. The first layer 235-*a* and the second layer 235-*b* may be an example of plate-shaped materials that include a glass material or a metallic material, among other examples. In some examples, the second layer 235-*b* may be coupled with an element 255, which may be an example of a functional element, or a blocking element, or one or more components, or any combination thereof. In some aspects, the element 255 may be coupled with the second layer 235-*b* prior to the bonding process to bond the first layer 235-*a* and the second layer 235-*b* and, in some cases, it may be desirable to prevent the element 255 from being subjected to electromagnetic radiation (e.g., to avoid material damage to the element 255). In some cases, the element 255 may be in contact with (e.g., touching) the second layer 235-*b*. The element 255 may be adhered to the second layer 235-*b*, for example, using an adhesive material, via a bonding process, among other examples.

The first optic 210 may be in a path of an output of the laser source 205 (e.g., in a beam path 240), and the laser beam 230 may accordingly be received by the first optic 210. The first optic 210 may be an example of the first optic 110 described with reference to FIG. 1. In some examples, the first optic 210 may be an example of a Trepanier optic. In such cases, the first optic 210 may cause the laser beam 230 to rotate about an axis of the beam path 240 (e.g., the first optic 210 may modify or shape the propagation of the laser beam 230 such that the laser beam 230 "wobbles" or oscillates, as described with reference to FIG. 1). In some aspects, the first optic 210 may include one or more optical plates (e.g., wedge plates, optical wedges, wedge prisms), where at least one optical plate of the one or more optical plates is configured to rotate about the axis of the beam path 240 to cause the laser beam 230 to rotate about the axis. In some aspects, the first optic 210 may be configured to rotate about the axis of the beam path 240.

In some examples, the system 200-*a*, the system 200-*b*, and the system 200-*c* may optionally include one or more additional optics configured to modify various properties of the laser beam 230. For instance, the system 200-*a*, the system 200-*b*, and/or the system 200-*c* may include a second optic that is used to shape the laser beam 230 into a beam having multiple focal lengths. The second optic may be an example of a diffractive optical element or other beam-shaping optical component, such as a multifocal diffractive lens. The second optic may enable the laser beam 230 to be concurrently focused at two or more positions along a propagation axis of the laser beam 230. In some aspects, the second optic may be used to generate multiple focal lengths that are used to focus the laser beam on one or more layers (e.g., the first layer 235-*a*, the second layer 235-*b*, or both) of the substrate 215 when bonding the layers together. In some examples, the second optic may be configured to rotate about the axis of the beam path 240.

The system 200-*a*, the system 200-*b*, and the system 200-*c* may optionally include one or more optics, which may be examples of the one or more optics 150 described with reference to FIG. 1. For example, the one or more optics may modify a focal distance of the laser beam 230 (e.g., based on a position of the substrate 215 relative to the one or more optics). In some aspects, the one or more optics may be configured to focus the laser beam 230 at a location of the substrate 215 where the laser beam 230 is incident on a surface of the first layer 235-*a*, or on a surface of the second layer 235-*b*, or on an interlayer bonding material, or any combination thereof, for bonding the first layer 235-*a* and the second layer 235-*b* (e.g., by at least partially melting the first layer 235-*a*, or the second layer 235-*b*, or the interlayer bonding material). The one or more optics may be an example of a lens, a mirror, or other optical component configured to modify a focus of the laser beam 230. In some aspects, the one or more optics may include other types of optics, such as lenses to optimize perspective correction and/or the focus of the laser beam 230.

The optical component 220 may be positioned after the first optic 210 (e.g., configured to receive the laser beam 230 output by the first optic 210, and the optical component 220 may include or be an example of an optical deflection component (e.g., a component configured to generate a tilted laser beam 230 with respect to the original beam path 240). For example, the optical component 220 may be configured to deflect the laser beam 230 one or more times, for example, using one or more deflecting optics (e.g., a first deflecting optic 245-*a*, a second deflecting optic 245-*b*). The one or more deflecting optics may include lenses, prisms, or mirrors, among other examples, and may be configured to deflect the laser beam 230. As an example, the optical component 220 may deflect the laser beam 230 a first time to a first angle with respect to the beam path 240 using the first deflecting optic 245-*a*, and the optical component 220 may deflect the laser beam 230 a second time to a second angle with respect to the beam path axis using the second deflecting optic 245-*b*.

The support component 225 may be configured to translate the substrate 215 in a lateral direction with respect to the beam path 240. In such cases, the support component may include one or more components or devices that are configured to hold the substrate during a bonding process (e.g., while the substrate is being processed by the laser beam 230) and move the substrate 215 in one or more directions while the laser beam 230 is incident on the one or more layers of the substrate 215. The support component 225 may be configured to translate the substrate 215 at various speeds. In some aspects, the translation of the substrate 215 using the support component 225 may enable the creation of one or more bonding pathways on or between the layers of the substrate 215, resulting in bonding of the respective layers. As described herein, the bonding pathways may have a spiral shape based on the translation of the substrate 215 by the support component 225 and the use of the first optic 210 that causes the laser beam 230 to rotate about the axis of the beam path 240. As a result of the translation of the substrate 215, the laser beam 230 may be observed to wobble (e.g., oscillate) with a spiral-shaped motion along each bonding pathway, where the laser beam 230 may be offset a threshold (e.g., maximum) distance, $d_w$, from the beam path 240 (e.g., as measured at the surface of the layer where the laser beam 230 is focused). In some aspects, the distance $d_w$ may be between about 30 micrometers (μm) and about 50 μm. Additionally, or alternatively, the distance may be some other value that is based on a configuration of the various components of the system 200-*a*, a configuration of the substrate 215, or any combination thereof. For instance, the distance $d_w$ may be application-specific (e.g., laminate-specific) and may, for example, be configurable based on a size and/or position of the element 255 coupled with the substrate 215, a material of one or more of the first layer 235-*a* or the second layer 235-*b*, or both, among other examples.

In some examples, the optical component 220 may cause the laser beam 230 to be incident on the substrate 215 at an acute angle (e.g., θ) such that the laser beam 230 irradiates one or both of the first layer 235-*a* or the second layer 235-*b* at a bonding pathway that is below the element 255 coupled with the second layer 235-*b*. More specifically, the optical component 220 may modify the direction of the laser beam 230 to cause the laser beam 230 to be incident on the first layer 235-*a*, on the second layer 235-*b*, on an interlayer bonding material, or any combination thereof, at a portion 260 of the first layer 235-*a* that is substantially below the element 255 (e.g., a blocking element, a functional element). In such cases, the element 255 is not irradiated by the laser beam 230, which may prevent the element 255 from being damaged by the laser beam 230 during the bonding process. The acute angle, θ, may be measured with respect to one or more surfaces of the substrate 215. For example, the incident laser beam 230 and a surface of the first layer 235-*a* (or a surface of the second layer 235-*b*) may describe the angle θ. In some cases, the angle, θ, may be about equal to 30° or some other angle that enables the laser beam 230 to irradiate the portion 260 below the element 255. For example, the angle, θ, may be between about 20° and 50°. In some aspects, the angle, θ, may be a threshold (e.g., minimum) angle that enables bonding of the first layer 235-*a* and the second layer 235-*b* (e.g., θ may be as small as possible). Additionally, or alternatively, the angle, θ, may be configurable (e.g., based on a configuration of the optical component 220 and/or the one or more deflecting optics) and may be based on a size of the element 255, location of the element 255, a shape of the element 255, or any combination thereof. In some examples, the laser beam 230 output by the optical component 220 may be focused on a rotational center of the original beam path 240, for example, based on the deflection of the laser beam 230.

The optics of the optical component 220 (e.g., including the first deflecting optic 245-*a*, the second deflecting optic 245-*b*, or both) may be arranged, positioned, or both, in one or more different configurations. In one example illustrated by FIG. 2B, the first deflecting optic 245-*a* and the second deflecting optic 245-*b* may be configured to deflect the laser beam 230 such that the laser beam is incident on a lens 265. The lens 265 may be included in the optical component 220 or positioned between the optical component 220 and the substrate 215. Further, the lens 265 may be an example of a focusing lens (e.g., a relatively large focus lens) and is configured to focus the laser beam 230 on the surface of the first layer 235-*a*, the surface of the second layer 235-*b*, on an interlayer bonding material, or any combination thereof, at the acute angle, θ. In such examples, the lens 265 may enable the use of relatively smaller angles (e.g., compared to other configurations) for efficiently processing the substrate 215 (e.g., bonding the first layer 235-*a* and the second layer 235-*b* of the substrate 215) in the presence of one or more elements 255. In some aspects, the angle, θ, achieved by the system 200-*b* may be relatively small (e.g., less than 30°, less than 20°, or the like). In some examples, the optical component 220 may rotate about the axis of the beam path 240 while the laser beam 230 irradiates one or more layers of the substrate 215. Additionally, or alternatively, the lens 265 may be fixed or may rotate about the axis of the beam path 240 while the laser beam 230 irradiates one or more layers of the substrate 215.

Additionally, or alternatively, the optical component 220 may include one or more additional or different optical components or elements that modify the direction of the laser beam 230 to be incident on the substrate at the acute angle, θ. As one example illustrated by FIG. 2C, the optical component 220 may include the first deflecting optic 245-*a*, the second deflecting optic 245-*b*, and an optical wedge 270 (e.g., an optical wedge prism) that is configured to deflect the laser beam 230 at the acute angle, θ. The optical wedge 270 may be configured to rotate while the laser beam 230 is irradiating a surface of a layer of the substrate 215. In some aspects, the angle, θ, achieved by the system 200-*c* may be relatively small (e.g., less than 30°, less than 20°, or the like). In some examples, the optical component 220 may rotate about the axis of the beam path 240 while the laser beam 230 irradiates one or more layers of the substrate 215.

In some examples, the system 200-*a*, the system 200-*b*, and the system 200-*c* may include an optical switching component 275 that is configured to couple the laser beam 230 to the optical component 220 or directly to the substrate 215. For instance, the optical switching component 275 may be an example of a beam switch (e.g., a laser beam switch) that is positioned after the first optic 210, and the optical switching component 275 may, at a first time, direct the laser beam 230 (e.g., rotating about the axis of the beam path 240) to the substrate 215 for bonding the respective layers of the substrate 215, where the laser beam 230 may be incident on the substrate 215 at about a right angle. At a second time, the optical switching component 275 may direct the laser beam 230 to the optical component 220 such that the laser beam 230 is incident on the substrate 215 at the acute angle, θ. Such operation of the optical switching component 275 may enable increased flexibility and processing efficiency during a bonding process for bonding layers of a laminate structure.

The system 200-*a*, the system 200-*b*, and the system 200-*c* may accordingly enable fast and efficient processing of the substrate 215 to bond the first layer 235-*a* and the second layer 235-*b* and generate the bonded laminate structure. In some aspects, the use of the laser beam 230 rotating about the axis of the beam path 240, in addition to tilting the laser beam 230 at the acute angle, θ, may enable the portion 260 of the substrate 215 below the element 255 to be bonded (e.g., the region between the first layer 235-*a* and the second layer 235-*b* and below the element 255 to be bonded) using the laser beam 230 that is rotating about the axis of the beam path 240, while also preventing the laser beam 230 from being incident on the element 255. In such cases, both the element 255 and the second layer 235-*b* may be bonded to the first layer 235-*a*. The element 255 may not be damaged by the laser beam 230 during the bonding process, and the respective layers of the substrate 215 may be irradiated to generate the bonded laminate structure.

Figure 3:
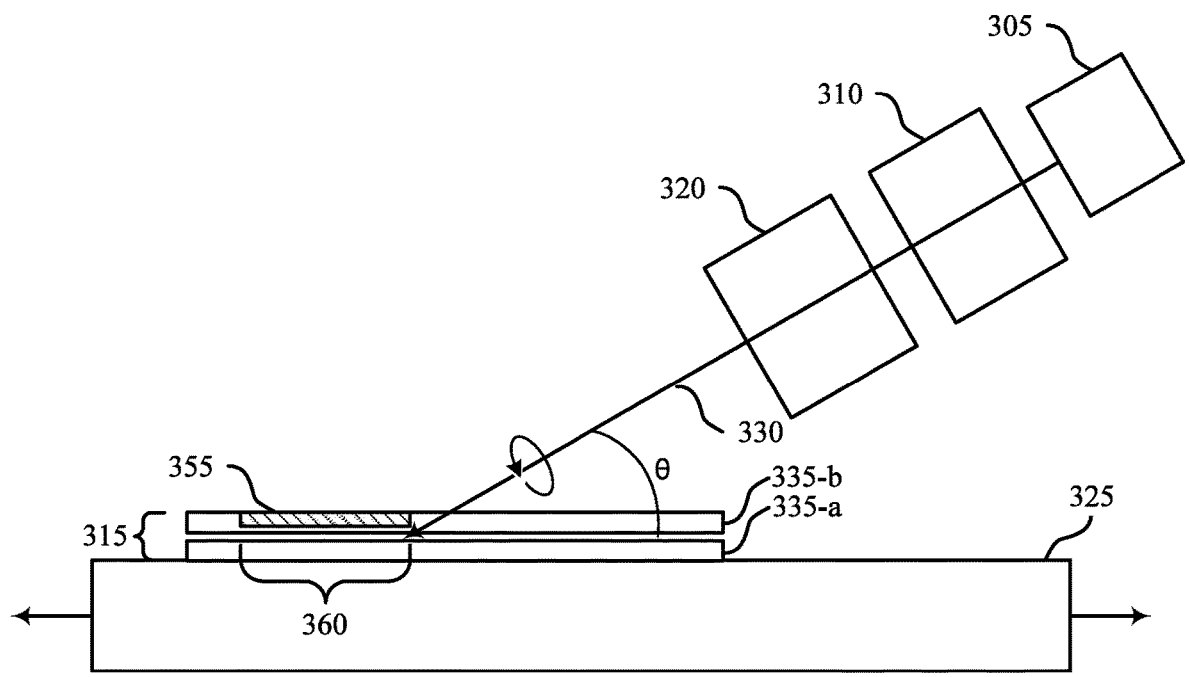
FIG. 3 illustrates an example of a system that supports techniques and apparatuses for bonding laminate structures in accordance with one or more aspects of the present disclosure.

FIG. 3 illustrates an example of a system 300 that supports techniques and apparatuses for bonding laminate structures in accordance with one or more aspects of the present disclosure. In some examples, the system 300 supports the irradiation of one or more layers of a substrate using a laser beam that rotates about an axis of a beam path (e.g., using a Trepanier optic) and is incident on the one or more layers at an acute angle. The system 300 may be an example of the system 100 described with reference to FIG. 1. For instance, the system may include various components, such as a laser source 305, a first optic 310, and a substrate 315. Further, the system 300 may include an optical component 320 and a support component 325. As illustrated, the components of the system 300 are inclined to cause the laser beam to be incident on the substrate 315 during the bonding process. The system 300 may thus be configured to bond respective layers of a laminate structure, including a region below an element coupled with the substrate 315.

The laser source 305 may be an example of the laser source 105 or the laser source 205 described with reference to FIG. 1 and FIG. 2, respectively. For example, the laser source 305 may generate a laser beam 330 that is used to irradiate one or more layers (e.g., a first layer 335-*a*, a second layer 335-*b*) of the substrate 315 for bonding the layers. The first layer 335-*a* may be an example of the first layer 135-*a* or the first layer 235-*a* described with reference to FIG. 1 and FIG. 2, respectively. Similarly, the second layer 335-*b* may be an example of the second layer 135-*b* or the second layer 235-*b* described with reference to FIG. 1 and FIG. 2, respectively. The first layer 335-*a* and the second layer 335-*b* may each be an example of a plate-shaped material that include a glass material or a metallic material, among other examples. In some cases, the second layer 335-*b* may be coupled with an element 355, which may be an example of a functional element, or a blocking element, or one or more components, or any combination thereof. In some aspects, the element 355 may be coupled with the second layer 335-*b* prior to the bonding process to bond the first layer 335-*a* and the second layer 335-*b*, and it may be desirable to prevent the element 355 from being subjected to electromagnetic radiation (e.g., to avoid material damage to the element 355).

The first optic 310 may be in a path of an output of the laser source 305 (e.g., in a beam path), and the laser beam 330 may accordingly be received by the first optic 310. The first optic 310 may be an example of the first optic 110 or the first optic 210 described with reference to FIG. 1 and FIG. 2, respectively. In some examples, the first optic 310 may be an example of a Trepanier optic, and the first optic 310 may cause the laser beam to rotate about an axis of the beam path (e.g., the first optic 310 may modify or shape the propagation of the laser beam 330 such that the laser beam 330 "wobbles" or oscillates, as described with reference to FIG. 1). In some aspects, the first optic 310 may include one or more optical plates (e.g., wedge plates, optical wedges, wedge prisms), where at least one optical plate of the one or more optical plates is configured to rotate about the axis of the beam path to cause the laser beam 330 to rotate about the axis. In some aspects, the first optic may be configured to rotate about the axis of the beam path.

In some examples, the system 300 may optionally include one or more additional optics configured to modify various properties of the laser beam 330. For instance, the system 300 may include a second optic that is used to shape the laser beam 330 into a beam having multiple focal lengths. The second optic may be an example of a diffractive optical element or other beam-shaping optical component, such as a multifocal diffractive lens. The second optic may enable the laser beam 330 to be concurrently focused at two or more positions along a propagation axis of the laser beam 330. In some aspects, the second optic may be used to generate multiple focal lengths that are used to focus the laser beam 330 on one or more layers (e.g., the first layer 335-*a*, the second layer 335-*b*, or both) of the substrate 315 when bonding the layers together. In some examples, the second optic may be configured to rotate about the axis of the beam path.

The system 300 may optionally include one or more optics, which may be examples of the one or more optics 150 described with reference to FIG. 1. For example, the one or more optics may modify a focal distance of the laser beam 330 (e.g., based on a position of the substrate 315 relative to the one or more optics). In some aspects, the one or more optics may be configured to focus the laser beam 330 at a location of the substrate 315 where the laser beam 330 is incident on a surface of the first layer 335-*a*, or on a surface of the second layer 335-*b*, or on an interlayer bonding material, or any combination thereof, for bonding the first layer 335-*a* and the second layer 335-*b* (e.g., by at least partially melting the first layer 335-*a*, or the second layer 335-*b*, or the interlayer bonding material). The one or more optics may be an example of a lens, a mirror, or other optical component configured to modify a focus of the laser beam 330. In some aspects, the one or more optics may include other types of optics, such as lenses to optimize perspective correction and/or the focus of the laser beam 330.

The optical component 320 may be positioned after the first optic 310, and the optical component 320 may include or be an example of a one or more optics used for focus correction based on the inclined position of the components of the system 300. In particular, because the laser beam 330 is rotating about the axis of the beam path, and because the laser beam 330 is inclined with respect to a surface of the substrate 315, the laser beam 330 may describe a relatively more oval-shaped sub-pathway where the laser beam is incident on, for example, the surface of the first layer 335-*a*. Thus, the optical component 320 may modify a focus of the laser beam 330 (e.g., provide focus correction) such that the laser beam 330 describes a relatively more circle-shaped sub-pathway where the laser beam is incident on, for example, the surface of the first layer 335-*a*, which may result in spiral-shaped bonding pathways to bond the first layer 335-*a* and the second layer 335-*b*.

The support component 325 may be configured to translate the substrate 315 in a lateral direction with respect to the beam path. In such cases, the support component may include one or more components or devices that are configured to hold the substrate during a bonding process (e.g., while the substrate is being processed by the laser beam 330) and move the substrate 315 in one or more directions while the laser beam 330 is incident on the one or more layers of the substrate 315. The support component 325 may be configured to translate the substrate 315 at various speeds. In some aspects, the translation of the substrate 315 using the support component 325 may enable the creation of one or more bonding pathways on or between the layers (e.g., the first layer 335-*a*, the second layer 335-*b*) of the substrate 315, resulting in bonding of the respective layers. As described herein, the bonding pathways may have a spiral shape based on the translation of the substrate 315 by the support component 325 and the use of the first optic 310 that causes the laser beam to rotate about the axis of the beam path.

In some examples, the inclination of the laser source 305, the first optic 310, and the optical component 320, may cause the laser beam 330 to be incident on the substrate 315 at an acute angle (e.g., $\theta$) such that the laser beam 330 irradiates one or both of the first layer 335-*a* or the second layer 335-*b* at a bonding pathway that is below the element 355 coupled with the second layer 335-*b*. That is, to generate the inclined beam, the beam path axis itself is inclined with respect to a main surface of the substrate 315. In such cases, the first optic 310 (e.g., the Trepanier optic) and any focal optics may be aligned to the beam path axis. Based on the inclination of the beam path, the laser beam 330 may be incident on the first layer 335-*a*, on the second layer 335-*b*, on an interlayer bonding material, or any combination thereof, at a portion 360 of the first layer 335-*a* that is substantially below the element 355 (e.g., a blocking element, a functional element). In such cases, the element 355 is not irradiated by the laser beam 330, which may prevent the element 355 from being irradiated by the laser beam 330 during the bonding process and while the laser beam 330 is incident on the substrate 315. In some cases, the angle, $\theta$, may be correspond to an angle formed by the laser beam 330 and a surface of the first layer 335-*a*, which may be about equal to 30° or some other angle that enables the laser beam 330 to irradiate the portion 360 below the element 355. In some aspects, the angle, θ, may be a threshold angle that enables bonding of the first layer 335-*a* and the second layer 335-*b* (e.g., θ may be as small as possible). Additionally, or alternatively, the angle, θ, may be configurable (e.g., based on a configuration of the system 300) and may be based on a size of the element 355, location of the element 355, a shape of the element 355, or any combination thereof. In some examples, the laser beam 330 output by the optical component 320 may be focused on a rotational center of the original beam path.

In some examples, the system 300 may include a switching component (not shown) that is configured to couple the laser beam 330 to the optical component 320 or directly to the substrate 315. For instance, the switching component may be an example of a laser beam switch that is positioned after the first optic 310, and the switching component may, at a first time, direct the laser beam 330 (e.g., rotating about the axis of the beam path) to the substrate 315 for bonding the respective layers of the substrate 315, where the laser beam may be incident on the substrate 315 at a right angle. At a second time, the switching component may direct the laser beam 330 to the optical component 320 such that the laser beam is incident on the substrate 315 at the acute angle, θ. Such operation of the switching component may enable increased flexibility and processing efficiency during a bonding process for bonding layers of a laminate structure.

The system 300 may accordingly enable fast and efficient processing of the substrate 315 to bond the first layer 335-*a* and the second layer 335-*b* and generate the bonded laminate structure. In some aspects, the use of the laser beam 330 rotating about the axis of the beam path, in addition to tilting the laser beam 330 at the acute angle, θ, may enable the portion 360 of the substrate 315 below the element 355 to be bonded (e.g., the region between the first layer 335-*a* and the second layer 335-*b* and below the element 355 to be bonded) using the laser beam 330 that is rotating about the axis of the beam path, while also preventing the laser beam 330 from being incident on the element 355. In such cases, both the element 355 and the second layer 335-*b* may be bonded to the first layer 335-*a*. The element 355 may not be damaged by the laser beam 330 during the bonding process, and the respective layers of the substrate 315 may be irradiated to generate the bonded laminate structure.

Figure 4:
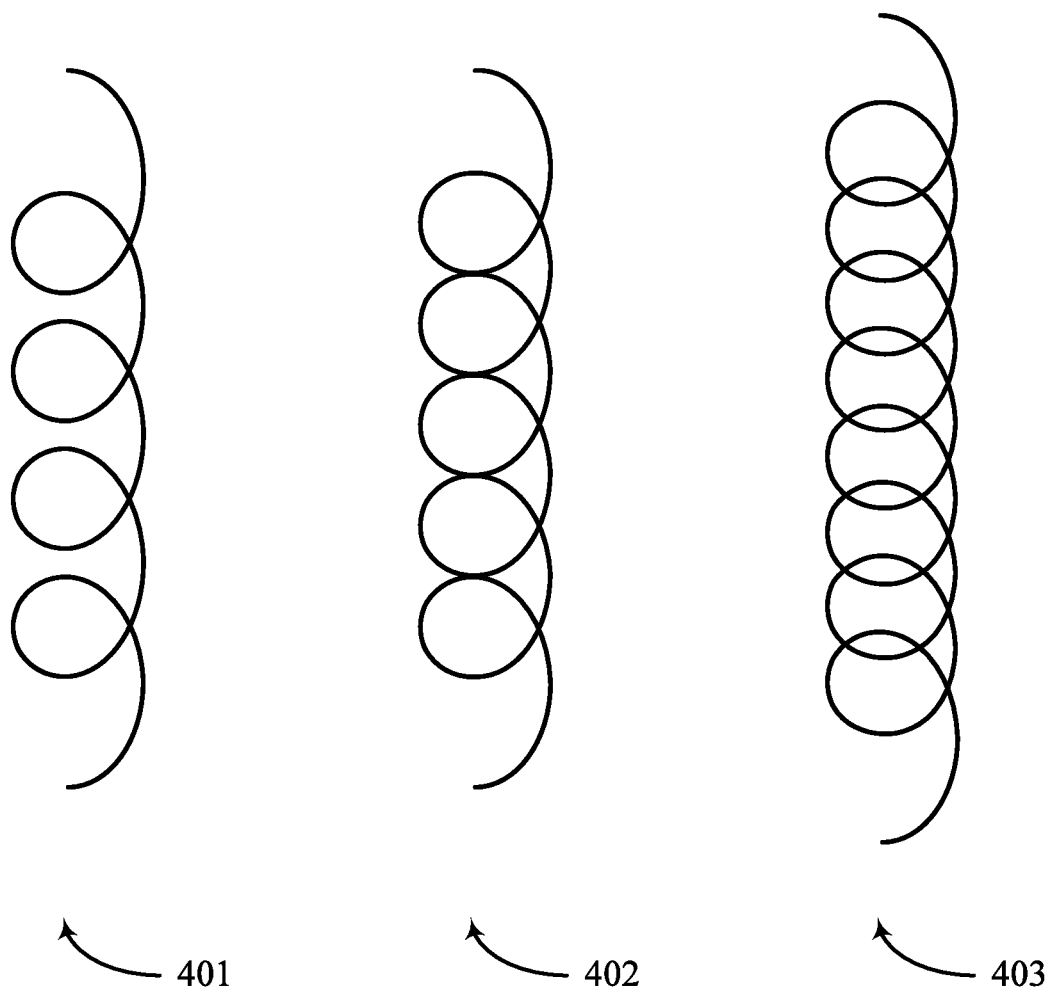
FIG. 4 illustrates an example of bonding pathways that support techniques and apparatuses for bonding laminate structures in accordance with one or more aspects of the present disclosure.

FIG. 4 illustrates an example of a bonding pathways 401, 402, and 403 that support techniques and apparatuses for bonding laminate structures in accordance with one or more aspects of the present disclosure. The bonding pathways 401, 402, and 403 may be generated using a laser beam having a propagation that is modified using a Trepanier optic, such that the laser beam rotates about an axis of the beam path while the laser beam is incident on a moving substrate. Further, the bonding pathways 401, 402, and 403 may illustrate examples of respective bonding structures on at least one surface of a bonded substrate, which may be an example of a substrate 115, substrate 215, or substrate 315, as described with reference to FIGS. 1, 2, and 3, respectively. The bonding pathways 401, 402, and 403 may thus be created by a laser beam that is incident on the at least one surface at an acute angle, and each of the bonding pathways 401, 402, and 403 may be generated, for example, using the system 200-*a*, the system 200-*b*, the system 200-*b*, or the system 300 described with reference to FIGS. 2A, 2B, 2C, and 3, respectively.

As described herein, two or more layers of a substrate may be bonded together using heat from an incident laser beam that is rotating about an axis of a path of the laser beam, producing one or more spiral-shaped bonding lines that result in enhanced bonding of the respective layers. Multiple bonding lines may be used to improve the bond strength between the respective layers, where the bonding lines may be, for example, parallel and adjacent to one other. In some examples, the substrate may include a first layer and a second layer positioned above the first layer, and the laser beam may be incident on a surface of the first layer at an acute angle with respect to the surface of the first layer. The substrate may be translated in a lateral direction with respect to the laser beam during the bonding process. Here, the acute angle of the laser beam may enable the irradiation of at least the surface of the first layer in a region that is below one or more elements that are coupled with one of the layers (e.g., coupled with the second layer).

The laser beam may be modified using an optic (e.g., a Trepanier optic) to create the laser beam that rotates about the axis, and the rotating laser beam may be directed to the surface of the first layer at the acute angle based on one or more optical components. In some aspects, the optical component(s) may include one or more mirrors or lenses, or a combination thereof, that modify a direction of the laser beam. Additionally, or alternatively, the optical components may include a focusing lens used for focus correction at the surface of the second layer. In any case, the layers of the substrate may be bonded together in the presence of an element (e.g., a functional element, a blocking element) that is coupled with the surface of the first layer, but the element may not be affected (e.g., may not be irradiated) by the laser beam.

Based on a translation speed of the substrate and a radial speed of rotational movement of a plate of the Trepanier optic (e.g., based on the rotational displacement, (I), of the third optical plate 145-*c* included in the first optic 110 described with reference to FIG. 1) the laser beam may describe different bonding pathways along a beam pathway on/in the substrate. As such, the bonding pathway may be a function of the translation speed or the radial speed, or both, which is illustrated by the bonding pathways 401, 402, and 403. As one example, a trepanning speed of the laser beam may be about 1 kilohertz (kHz), for example, based on a 25 millimeter (mm) per second path velocity and a 25 μm trepanning center of motion. The translation speed of the substrate and the radial speed of rotational movement of the plate of the Trepanier optic may be application-specific (e.g., laminate-specific) and configurable based on one or more parameters, such as a desired bonding strength, one or more types of materials to be bonded, or the like. Further, each bonding pathway 401, 402, 403 may include multiple circular portions that make up the spiral-like bonding line, and each circular portion may have an approximate diameter of, for example, between about 60 μm and about 100 μm. The diameter of the circular portions of the bonding pathways 401, 402, 403, however, may have different (e.g., smaller, larger) diameters than the values described herein.

For instance, in the example of the bonding pathway 401, the translation speed may be relatively greater than the radial speed, such that each described circle (e.g., corresponding to a cycle of rotation of a wedge plate of a Trepanier optic) intersects only in a first intersection point. However, as illustrated in the example of the bonding pathway 402, if the radial speed is approximately balanced relative to the translation speed (e.g., the radial speed is about the same as the translation speed), each circle of the bonding pathway 402 may intersect two times (e.g., at a first intersection point and at a second intersection point). Further, if the radial speed is relatively greater than the translation speed, each circle of the bonding pathway 403 may intersect three times (e.g., at a first, second, and third intersection point).

In some aspects, a relative bonding strength may correspond to the quantity of intersection points of a bonding pathway. For example, the bonding pathway 403 may provide a relatively stronger bond between two layers of a substrate (e.g., compared to the bonding pathway 402 and bonding pathway 401). Similarly, the bonding pathway 402 may provide a relatively strong bond between two layers of a substrate (e.g., compared to the bonding pathway 401), but may provide a relatively weaker bond compared to the bonding pathway 403. In any case, in accordance with the techniques described herein, the bond strength may be configurable based on the inclusion of the Trepanier optic to shape the propagation of the laser beam used to irradiate the substrate, providing increased flexibility in the bonding process when forming laminate structures. Moreover, by using bonding pathways having a relatively increased bond strengths, fewer processing passes may be performed on the substrate when bonding multiple layers, enabling relatively reduced processing time and increasing manufacturing efficiency.

Figure 5:
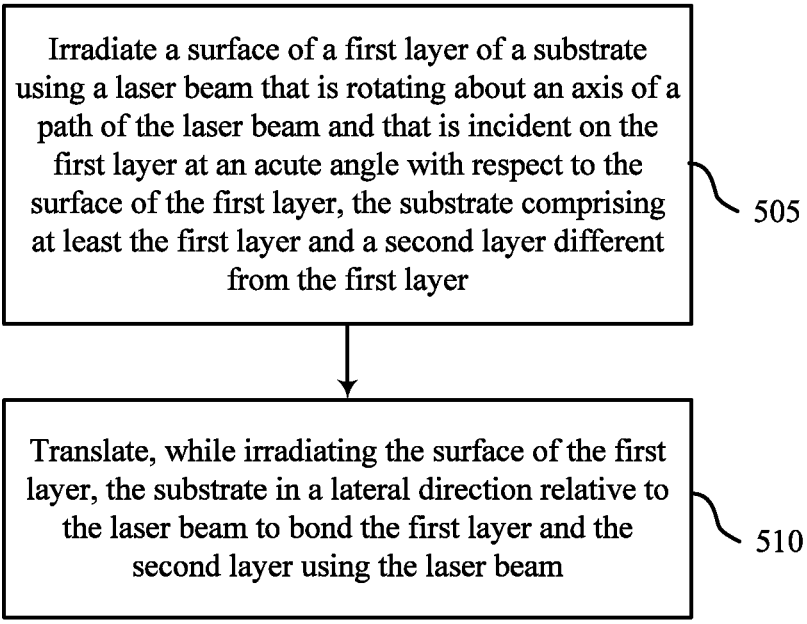
FIGS. 5 and 6 show flowcharts that support techniques and apparatuses for bonding laminate structures in accordance with one or more aspects of the present disclosure.

FIG. 5 shows a flowchart illustrating a method 500 that supports techniques and apparatuses for bonding laminate structures in accordance with one or more aspects of the present disclosure. The operations of the method 500 may be implemented by a device or its components as described herein. For example, the operations of the method 500 may be performed by a system configured for bonding two or more layers of a substrate via a laser beam shaped by a Trepanier optic, as described with reference to FIGS. 1, 2A, 2B, 2C, 3, and 4. In some examples, a device may execute a set of instructions to control the functional elements of the device to perform the described functions. Additionally, or alternatively, the device may perform aspects of the described functions using special-purpose hardware.

At 505, the method may include irradiating a surface of a first layer of a substrate using a laser beam that is rotating about an axis of a path of the laser beam and that is incident on the first layer at an acute angle with respect to the surface of the first layer, the substrate including at least the first layer and a second layer different from the first layer. The operations of 505 may be performed in accordance with examples as disclosed herein.

At 510, the method may include translating, while irradiating the surface of the first layer, the substrate in a lateral direction relative to the laser beam to bond the first layer and the second layer using the laser beam. The operations of 510 may be performed in accordance with examples as disclosed herein.

In some examples, an apparatus as described herein may perform a method or methods, such as the method 500. The apparatus may include, features, circuitry, logic, means, or instructions (e.g., a non-transitory computer-readable medium storing instructions executable by a processor) for irradiating a surface of a first layer of a substrate using a laser beam that is rotating about an axis of a path of the laser beam and that is incident on the first layer at an acute angle with respect to the surface of the first layer, the substrate including at least the first layer and a second layer different from the first layer, and include translating, while irradiating the surface of the first layer, the substrate in a lateral direction relative to the laser beam to bond the first layer and the second layer using the laser beam.

In some examples of the method 500 and the apparatus described herein, one or more blocking elements may be coupled with the second layer of the substrate, the second layer of the substrate being located between the first layer and a source of the laser beam. In some examples of the method 500 and the apparatus described herein, the apparatus may include operations, features, circuitry, logic, means, or instructions for irradiating the surface of the first layer below each of the one or more elements without irradiating the one or more blocking elements based on the acute angle of the laser beam.

In some examples of the method 500 and the apparatus described herein, the acute angle is based on a position of the one or more blocking elements, a size of the one or more blocking elements, or both.

In some examples of the method 500 and the apparatus described herein, the modifying a direction of the laser beam two or more times prior to the laser beam being incident on the surface of the first layer, where the acute angle based on the modified direction.

In some examples of the method 500 and the apparatus described herein, the apparatus may include operations, features, circuitry, logic, means, or instructions for focusing the laser beam at the surface of the first layer based on the acute angle of the laser beam, where the laser beam generates a spiral-shaped bonding pathway while the substrate is translated based on focusing the laser beam.

In some examples of the method 500 and the apparatus described herein, the apparatus may include operations, features, circuitry, logic, means, or instructions for modifying a rotational speed of the laser beam, or a speed of the translation, or both, where the surface of the first layer is irradiated along one or more bonding pathways that are based on the rotational speed, or the speed of the translation, or both.

In some examples of the method 500 and the apparatus described herein, the apparatus may include operations, features, circuitry, logic, means, or instructions for modifying a first material of the first layer, or a second material of the second layer, or both, based on translating the substrate, where the modified first material, or the modified second material, or both, bonds the first layer with the second layer.

In some examples of the method 500 and the apparatus described herein, irradiating the surface of the first layer bonds the first layer and the second layer based on irradiating an interlayer material between the first layer and the second layer while translating the substrate.

Figure 6:
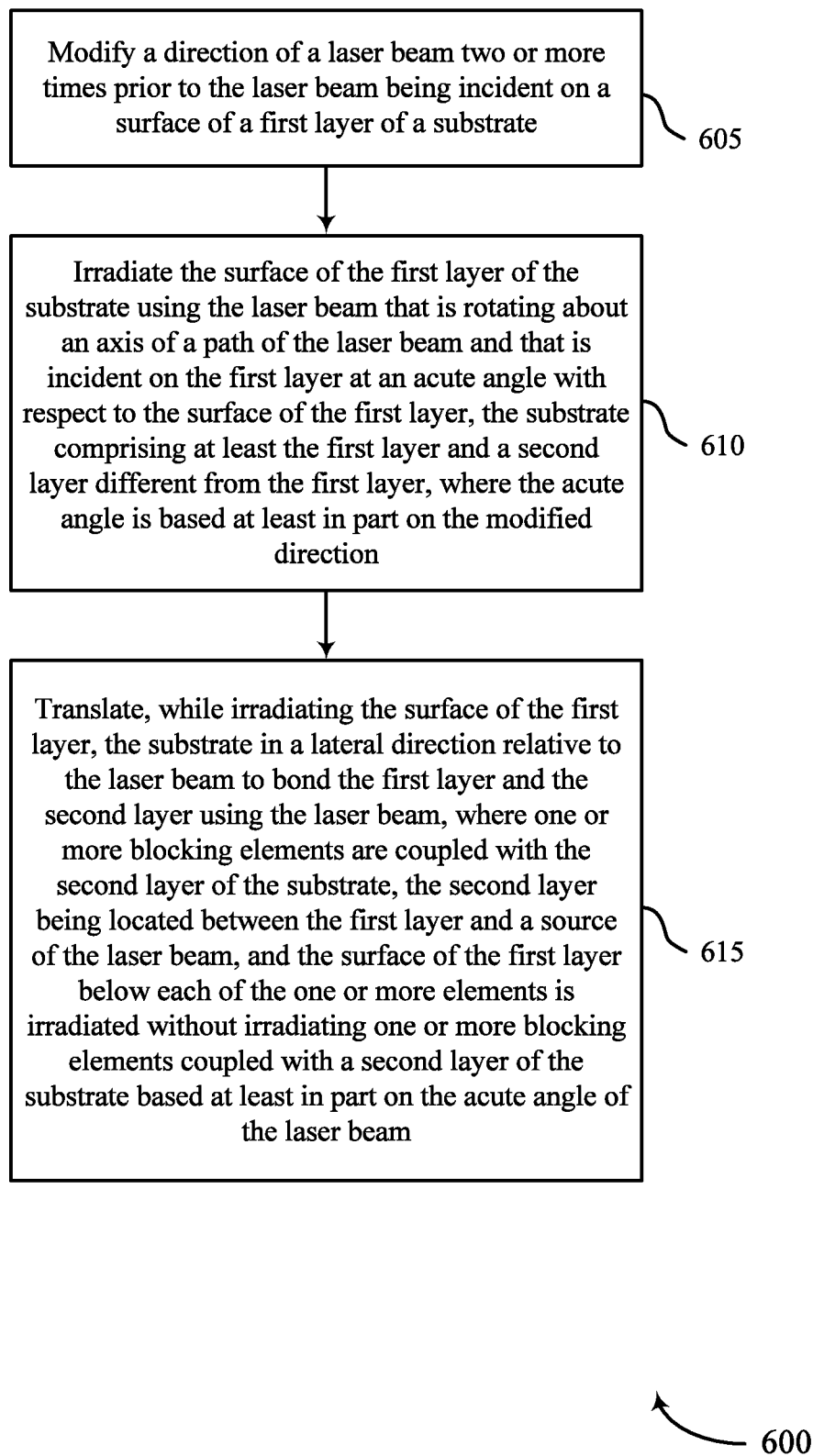

FIG. 6 shows a flowchart illustrating a method 600 that supports techniques and apparatuses for bonding laminate structures in accordance with one or more aspects of the present disclosure. The operations of the method 600 may be implemented by a device or its components as described herein. For example, the operations of the method 600 may be performed by a system configured for bonding two or more layers of a substrate via a laser beam shaped by a Trepanier optic, as described with reference to FIGS. 1, 2A, 2B, 2C, 3, and 4. In some examples, a device may execute a set of instructions to control the functional elements of the device to perform the described functions. Additionally, or alternatively, the device may perform aspects of the described functions using special-purpose hardware.

At 605, the method may include modifying a direction of a laser beam two or more times prior to the laser beam being incident on a surface of a first layer of a substrate. The operations of 605 may be performed in accordance with examples as disclosed herein.

At 610, the method may include irradiating the surface of the first layer of the substrate using the laser beam that is rotating about an axis of a path of the laser beam and that is incident on the first layer at an acute angle with respect to the surface of the first layer, the substrate including at least the first layer and a second layer different from the first layer, where the acute angle is based on the modified direction. The operations of 610 may be performed in accordance with examples as disclosed herein.

At 615, the method may include translating, while irradiating the surface of the first layer, the substrate in a lateral direction relative to the laser beam to bond the first layer and the second layer using the laser beam, the second layer being located between the first layer and a source of the laser beam, and the surface of the first layer below each of the one or more elements is irradiated without irradiating one or more blocking elements coupled with a second layer of the substrate based on the acute angle of the laser beam. The operations of 615 may be performed in accordance with examples as disclosed herein.

An apparatus is described. The apparatus may include a laser source configured to generate a laser beam along a path, a first optic configured to receive the laser beam and cause the laser beam to rotate about an axis of the path, and an optical component configured to receive the laser beam output by the first optic and cause the laser beam to be incident on a substrate at an acute angle relative to a surface of the substrate, the substrate including a plurality of layers. In some examples, the apparatus may include a support component configured to laterally translate the substrate relative to the path while the laser beam is incident on the substrate.

In some examples, the laser beam is configured to be incident on a portion of a first layer of the plurality of layers while the substrate is laterally translated relative to the laser beam, where the substrate includes a blocking element coupled with a second layer of the plurality of layers, and the portion of the first layer is located beneath the blocking element.

In some examples, the optical component further includes one or more mirrors, or one or more lenses, or any combination thereof, that are configured to modify a direction of the laser beam to cause the laser beam to be incident on the substrate at the acute angle.

In some examples, the first optic includes two or more optical plates, where a first optical plate of the two or more optical plates is configured to rotate about the axis to cause the laser beam to rotate about the axis and a second optical plate of the two or more optical plates is configured to translate along the axis.

In some examples, the apparatus includes a second optic configured to shape the laser beam into a beam having a plurality of focal lengths, where the laser beam is configured to be incident on the substrate based on the plurality of focal lengths. In some examples, the second optic is configured to rotate about the axis.

In some examples, the apparatus includes an optical switching component configured to direct the laser beam toward the optical component or to the substrate, where the optical switching component is positioned between the first optic and the optical component.

A bonded substate is described. The bonded substrate may include a first layer and a second layer above the first layer, the first layer having a surface that is bonded to the second layer via one or more irradiated spiral paths across the surface, where a portion of the second layer includes a blocking element that is unaffected by irradiation, and where a portion of the first layer beneath the portion of the second layer includes at least one irradiated spiral path bonding the first layer and the second layer.

In some examples, the surface of the first layer is bonded to the second layer based on a set of parallel bonding pathways including irradiated spiral paths. In some examples, the first layer includes a glass material or a metallic material. In some examples, the second layer includes a glass material or a metallic material.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the term "about" means that the modified characteristic (e.g., a verb or adjective modified by the term substantially) or a related aspect (e.g., related action or function), need not be absolute but is close enough to achieve the advantages of the characteristic or related aspect (e.g., related action or function).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a digital signal processor (DSP), a central processing unit (CPU), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise random-access memory (RAM), read-only memory (ROM), electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    irradiating a surface of a first layer of a substrate using a laser beam that is rotating about an axis of a path of the laser beam and that is incident on the first layer at an acute angle with respect to the surface of the first layer, the substrate comprising at least the first layer, a second layer different from the first layer and a blocking element coupled with the substrate,
    wherein irradiating the surface of the first layer comprises irradiating the surface below the blocking element without irradiating the blocking element based at least in part on the acute angle of the laser beam; and
    translating, while irradiating the surface of the first layer, the substrate in a lateral direction relative to the laser beam to bond the first layer and the second layer using the laser beam.

2. The method of claim 1, wherein the second layer is located between the first layer and a source of the laser beam.

3. The method of claim 1, wherein irradiating the surface of the first layer below the blocking element comprises bonding the first layer and the second layer, using the laser beam, below the blocking element.

4. The method of claim 1, wherein the acute angle is based at least in part on a position of the blocking element, a size of the blocking element or both.

5. The method of claim 1, further comprising:
    modifying a direction of the laser beam two or more times prior to the laser beam being incident on the surface of the first layer, wherein the acute angle is based at least in part on the modified direction.

6. The method of claim 5, further comprising:
    modifying the direction of the laser beam with a Trepanier optic.

7. The method of claim 5, wherein modifying the direction of the laser beam comprises deflecting the laser beam a distance $d_w$ from the axis of the path of the laser beam as the laser beam rotates around the path.

8. The method of claim 1, further comprising:
    focusing the laser beam at the surface of the first layer based at least in part on the acute angle of the laser beam, wherein the laser beam generates a spiral-shaped bonding pathway while the substrate is translated based at least in part on focusing the laser beam.

9. The method of claim 1, further comprising:
    modifying a rotational speed of the laser beam, or a speed of translation, or both, wherein the surface of the first layer is irradiated along one or more bonding pathways that are based at least in part on the rotational speed, or the speed of the translation, or both.

10. The method of claim 1, wherein irradiating the surface of the first layer comprises:
    modifying a first material of the first layer, or a second material of the second layer, or both, based at least in part on translating the substrate, wherein modifying the first material, or modifying the second material, or both, bonds the first layer with the second layer.

11. The method of claim 1, wherein irradiating the surface of the first layer bonds the first layer and the second layer based at least in part on irradiating an interlayer material between the first layer and the second layer while translating the substrate.

12. The method of claim 1, wherein the laser beam is inclined with respect to the surface of the first layer.

13. The method of claim 1, further comprising:
    deflecting the laser beam to a first angle with respect to the path of the laser beam with a first deflecting optic and deflecting the laser beam to a second angle with respect to the path of the laser beam with a second deflecting optic.

14. The method of claim 13, further comprising:
deflecting the laser beam at the acute angle with respect to the surface of the first layer with an optical wedge.

* * * * *